(12) United States Patent
Hairford

(10) Patent No.: US 8,547,432 B1
(45) Date of Patent: Oct. 1, 2013

(54) SURVEILLANCE SYSTEM

(76) Inventor: Jerald A. Hairford, Tyler, TX (US)

( * ) Notice: Subject to any disclaimer, the term of this patent is extended or adjusted under 35 U.S.C. 154(b) by 2334 days.

(21) Appl. No.: 11/086,128

(22) Filed: Mar. 23, 2005

(51) Int. Cl.
*H04N 7/18* (2006.01)

(52) U.S. Cl.
USPC .......................................... 348/143

(58) Field of Classification Search
USPC ............. 348/61, 81, 124, 143, 148, 164, 372, 348/373; 396/427; 340/425.5; 382/100
IPC ........................................................ H04N 7/18
See application file for complete search history.

(56) References Cited

U.S. PATENT DOCUMENTS

| | | | |
|---|---|---|---|
| 4,492,763 A | | 1/1985 | Trotta et al. |
| 5,923,380 A | * | 7/1999 | Yang et al. ..................... 348/586 |
| 5,940,139 A | * | 8/1999 | Smoot ............................ 348/584 |
| 6,064,430 A | * | 5/2000 | Lefkowitz ..................... 348/151 |
| 6,249,310 B1 | | 6/2001 | Lefkowitz ..................... 348/151 |
| 6,476,859 B1 | * | 11/2002 | Galloway et al. ............. 348/164 |
| 6,509,832 B1 | * | 1/2003 | Bauer et al. ................. 340/425.5 |
| 6,642,955 B1 | * | 11/2003 | Midgley et al. ............... 348/164 |
| 6,703,925 B2 | * | 3/2004 | Steffel ........................ 340/425.5 |
| 6,735,387 B1 | * | 5/2004 | Schnell .......................... 396/263 |
| 6,812,970 B1 | * | 11/2004 | McBride ........................ 348/372 |
| 6,824,317 B2 | * | 11/2004 | Finizio et al. .................. 396/427 |
| 6,972,787 B1 | * | 12/2005 | Allen et al. ..................... 348/162 |
| 6,980,228 B1 | * | 12/2005 | Harper ............................ 348/81 |
| 7,034,927 B1 | * | 4/2006 | Allen et al. ...................... 356/71 |
| 7,171,827 B2 | | 2/2007 | Autery et al. |
| 7,319,226 B2 | * | 1/2008 | Huang .......................... 250/330 |
| 7,376,244 B2 | * | 5/2008 | Baer ............................. 382/103 |
| 2006/0049154 A1 | * | 3/2006 | Clifford et al. .......... 219/121.64 |

OTHER PUBLICATIONS

Novalog, "Plastics for IR Data Transmission Windows," www.novalog.com, Jun. 1997, pp. 1-7.

* cited by examiner

*Primary Examiner* — Tung Vo
(74) *Attorney, Agent, or Firm* — Daniel J. Chalker; Chalker Flores, LLP

(57) ABSTRACT

A surveillance system for observing a scene clandestinely includes a concealment device having a wall at least part of which is formed from a glass or plastic that appears substantially opaque to the human eye but is permeable to the passage of infrared light, and a camera positioned within the concealment device at the visually opaque wall to enable viewing or recording of the scene.

20 Claims, 1 Drawing Sheet

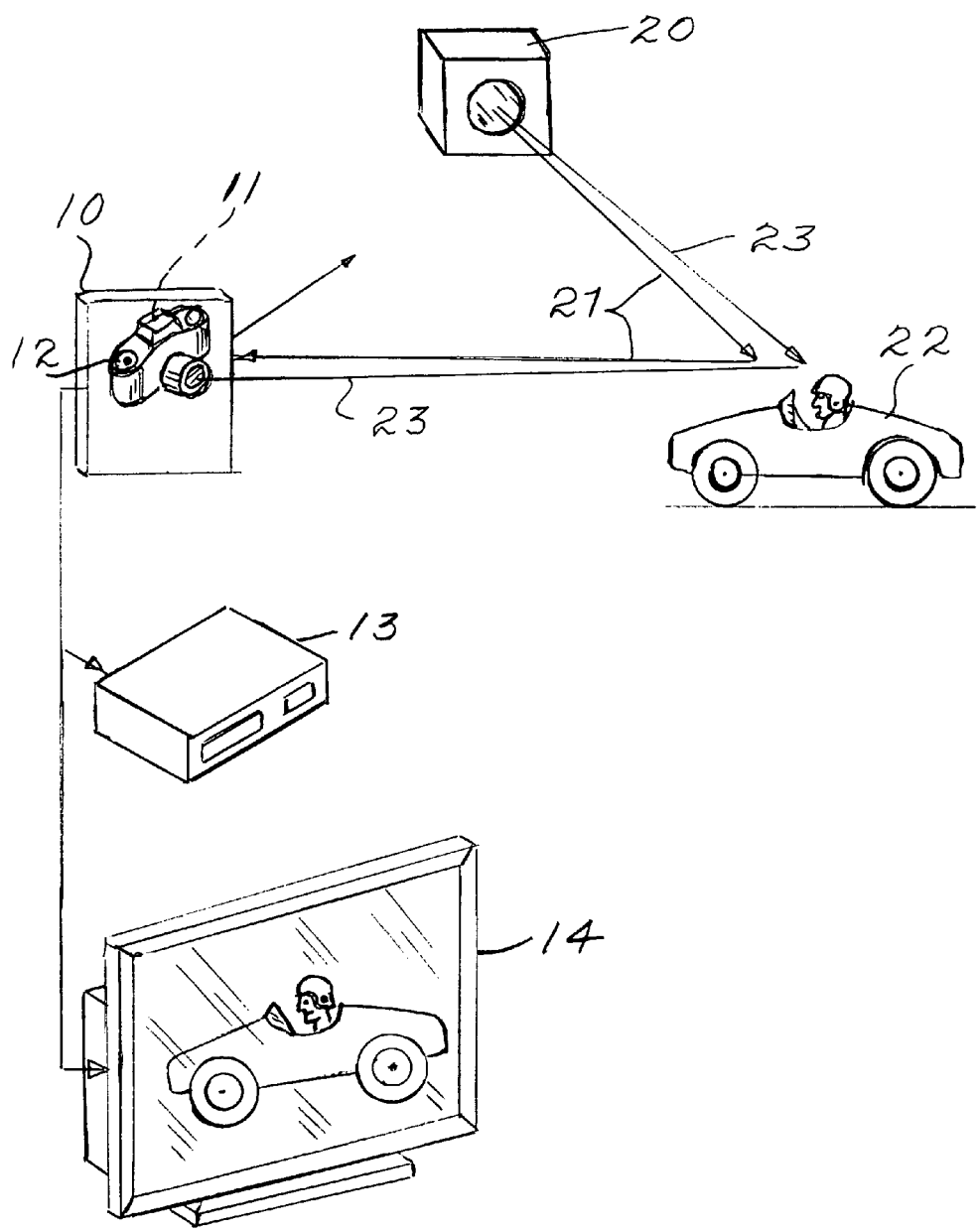

SURVEILLANCE SYSTEM

FIELD OF THE INVENTION

The present invention relates in general to surveillance systems whereby a scene or locale can be monitored, action at the location being viewed either in real time or stored for future reference. More particularly, it relates to such systems in which the camera recording the scene is located where its presence will be hidden most effectively from those being recorded.

BACKGROUND OF THE INVENTION

Surveillance systems are in everyday use at the present time, most commonly exemplified by the video camera focused on the tellers window at a bank or the eye-in-the-sky camera positioned over each blackjack table at a gambling casino to enable casino personnel to observe the dealing below to spot possible cheating or card counting. Such television cameras are, however, fully exposed to the view of those who may enter the bank, or even a convenience store, with a nefarious purpose. As a consequence, it is a not unusual occurrence for the perpetrator of an act to destroy the video camera or at least to remove the recording medium from the camera and thereby avoid the visual recognition provided by the camera and its medium.

At a more sophisticated level, surveillance systems have been mounted in police cars and other vehicles. Such a system includes a camera and a control head mounted within the vehicle, as well as a video recorder secured within the vehicle at an accessible location, for example, in the trunk of the car. When a police officer stops a motorist, the surveillance system is manually or automatically activated so that many details of the stop, including the actions of the motorist and the officer, are recorded for later inspection.

A common difficulty with all such systems, however, is the fact that the camera or the control head, or even the eye-in-the-sky casino device have photographic means that is either readily self-apparent or can be discovered with advance knowledge of the system or with modest effort. Thus, all such systems are subject either to destruction of the system or a camera part thereof, or to the temporary evasion of the system, for example, by simply throwing a piece of cloth over the camera or its control head.

It is, therefore, a primary object of the present invention to provide a surveillance system in which the means photographing the scene is so well disguised that it is highly unlikely to be discovered by a perpetrator at the scene, and thereby subject to destruction or disablement.

It is another object of my invention to provide a surveillance system that is not only well camouflaged but in which the recording medium is subject to a plurality of disguised locations, so that the knowledge of a perpetrator of the location of one such camouflaged device will not lead to the obvious discovery of other such devices.

SUMMARY OF THE INVENTION

The present invention takes advantage of the property of certain materials to permit the passage of light rays in the infrared region of the spectrum while substantially blocking the passage of light in the visible region. So, in a basic form, the invention comprises a surveillance system including a container at least part which is formed from a glass or plastic that appears to be substantially opaque to the human eye, but is permeable to the passage of at least a substantial segment of infrared rays. A camera is positioned within the container at a location such that infrared rays pass through the infrared ray permeable wall of the container and into the receptor of the camera, thereby enabling a viewer to observe the scene without the knowledge of those at the scene.

In its practical application, the camera includes a sensor, rather than film, in the form of a sensor chip that stores the light energy in so-called bins according to its energy. With the greater energy, or amplitude, discharge of the bin produces a white ray of visible light; with no stored energy, the discharge from the bin is black. Intermediate charges in each bin produce shades of gray upon discharge.

The storage means of the bins is versatile insofar as the storage may be only temporary, enabling the light to be passed to a monitor so that the scene can be viewed in real time, or the chip can pass the light energy from the scene to a storage apparatus for later viewing.

As stated, one advantage of my invention is that it lends itself to an infinite number of containers or enclosures for the camera, such containers only being limited by the ingenuity of the system operator. Thus, the container for the camera can take the form of a coffee mug sitting on a desk, or a jar of pipe tobacco, or even a vase placed on a mantel. The only limitation to the form of the camera concealing enclosure is that it be an object that is normally made of glass or a plastic that has an outward appearance similar to opaque glass or plastic. As used herein the term, glass, is meant to include both a conventional glass and a plastic resin, which may be opaque or mirrored.

With respect to its color, the container of the surveillance system will appear to be substantially opaque so as not to reveal the camera within it. Yet its wall in back of which the camera is positioned will preferably transmit through it at least 50% of the infrared light impinging on the wall, even more preferably, at least 85% of such light.

As substantial opacity is an important characteristic, the container, which may preferably be an acrylic or polycarbonate resin, is usually a shade of red, more preferably deep red, and most preferably a deep red identified by the trade by the number 2711. By using such a deep red shade of resin, the container wall appears almost black and almost opaque, thus masking the presence of the camera positioned therewithin.

These and other objects, features and advantages of my invention will be better understood by reference to preferred embodiments or best modes of my invention as set forth in the following description and in the drawing in which the sole FIGURE is a diagrammatic view of such a best mode.

DETAILED DESCRIPTION OF PREFERRED EMBODIMENTS

Referring now to the drawing and the sole FIGURE thereof, the present invention comprises a container or enclosure 10 that serves as a housing for a camera 11. That camera has a receptor in the form of a sensor 12 particularly adapted to receive light energy in the infrared region of the spectrum. As translated by the sensor, electrical impulses representing the infrared light rays impinging on the sensor are passed to a recording instrument, in this case in the form of a digital video recorder (DVR) 13, and/or to a monitor 14, where the image may be viewed in real time.

As will be apparent from the drawing, the passage of light rays is essential to the function of the system. Tracing the movement of light rays, the FIGURE shows, in diagrammatic form, a source of such light, identified by reference numeral 20. Obviously such source may be the sun or any convenient artificial illumination. Light rays 21 in the visible spectrum pass from the source 20 to a reflective object 22, which is to be viewed. When the source is the sun or many other sources, infrared rays 23 are also generated and illuminate the reflective object 22.

After contacting the reflective object 22, both the visible rays 21 and the infrared rays 23 are reflected by object 22 and pass to the camera 11 within the enclosure 10. Because of the nature of the material from which the enclosure 10 is formed, visible light 21 is preferably simply reflected away, as is seen by the direction of the arrow that diagrammatically represents light in the visible spectrum. Infrared rays 23, however, pass through the body of the container 10 and impinge on the camera 11 and, more specifically, the sensor 12 with which the camera is equipped. This sensor, which is in the form of a chip, translates the infrared light impinging on it to a series of electrical charges, which then pass by hardwire or other means to a recording device 13, here shown in the form of a DVR, and/or to a monitor 14 where the image of the reflective object 22 may be viewed. If the storage device 13 is bypassed, that image will be viewed in real time. If the signal to the monitor comes from the storage device, the image will be viewed some time after it has been recorded.

The infrared absorption characteristic of the material from which either the entirety or part of the enclosure or container 10 is formed constitutes an important part of my invention. Most commonly the so-called glass that is used in this invention either as the entirety of a container for a camera, or as a window in the container that permits the transmission of IR light, is formed from plastic resins in the families of acrylics or polycarbonates. Both types are readily available under a variety of trademarks. Some of the commonly available acrylic polymers are those manufactured and sold by Calsak Corporation, of Compton, Calif. under the mark Acrylcast, by Cryo Industries, of Orange, Conn. under the mark Acrylite, by AtoHaas Americas, Inc., of Bristol, Pa., under the mark Plexiglas, and by Polycast Technology Corporation, of Stamford, Conn., under the mark Polycast. Acrylic "glasses" are readily available, either in sheet form or as pellets. In the latter form objects may be molded from the resin in any desirable shape.

Polycarbonates are also available from several sources. Polycarbonates are manufactured by Bayer Corporation, of Irvine, Calif. under the mark Makrolon 2405. Color number 7881 is well adapted to be used as an IR filter. It appears to be black in reflected light. The Dow Chemical Company, of Midland, Mich., recommends their Calibre 301 or 303 polycarbonates for IR windows. General Electric Company, of Pittsfield, Mass., manufactures polycarbonates in the form of sheet stock and pellets. Lexan 9034 is available in many colors, and Lexan 121 is particularly well adapted for use as an IR transmitting material.

Whether one is using an acrylic or polycarbonate as the glass from which the container 10 is formed, color is an important attribute of the resin. Ideally, the color should be such that, while it reflects light in the visible portion of the spectrum and absorbs light in the IR region, the enclosure or window in the enclosure will appear to be black. Of course, the color selected must be such as will permit the transmission of a high percentage of IR light. Yet, for the purpose of the present invention, the color should appear to be black or at least substantially opaque to mask the camera within the container.

For the purpose of showing the manner in which a color may be selected for a plastic used in the present invention, Table 1 below illustrates the characteristics of acrylics of various, standard colors.

TABLE 1

| Color Number | Color Name | Appearance | Typical IR Transmittance (percent) |
|---|---|---|---|
| 2025 | black | semi opaque | 0 |
| 2050 | blue | translucent | 4 |
| 2064 | gray | transparent | 48 |
| 2157 | red | translucent | 2 |
| 2404 | bronze | transparent | 56 |
| 2423 | red | transparent | 90 |
| 2711 | deep red | semi opaque | 85-90 |
| None | colorless | transparent | 92 |

Note
The above transmittance values are for 0.118 inch thickness, equal to 3 mm. Transmittance varies inversely (logorithmically) proportional to thickness, therefore transmittance of thinner plastic is slightly greater, that of thicker plastic slightly less.

From Table 1 it will be seen that, while a colorless acrylic has the best IR transmission, it is transparent and, for the purposes of the present invention, would be unsuitable for use. The same may be true of a red acrylic, which transmits about 90% of IR light but is transparent to the eye. From this Table it will be apparent that color no. 2711, which is deep red and is semi-opaque, is, as presently advised, the best mode of carrying out my invention, as it does transmit 85 to 90% of the IR light impinging on it, yet will mask the camera within an enclosure formed from an acrylic resin of that color.

The colors for polycarbonates are allied to those for acrylics set forth in Table 1. General Electric's deep red polycarbonate marketed as Lexan 9034 is semi-opaque and appears black to the naked eye while retaining the ability to pass through 85-90% of the IR light impinging on it. Another GE polycarbonate adapted for use as an IR filter is Lexan 121, which is at this time available in the form of injection molding pellets. Several IR transmission colors may be had in shades of green and blue-violet, which appear black in reflected light.

Regarding cameras suitable for use in the present system, Infrared Solutions, Inc. of Minneapolis, Minn. markets a series of cameras for sensing and imaging IR light. Their IR FlexCam series of cameras are adaptable for use in my system, although they are advertised as being adapted for roofing surveys and to pinpoint hot spots.

From the above description, it will be seen that my invention presents a system that is adapted for many uses, and that the enclosures or containers, which are generally referred to as concealment devices or host devices, that are part of the system can take many forms. For example, a coffee mug or tobacco jar sitting on a desk can contain a camera and survey a scene, or a vase on a mantel can accomplish the same purpose. It will, therefore, be seen that the invention can take many different forms and that the preferred embodiments hereinbefore described can be modified extensively without departing from the scope of the invention. As to all such modifications, it is desired that they be included within the spirit of my invention, which is to limited only by the scope, including equivalents, of the following, appended claims.

I claim:

1. A surveillance system for observing a scene without the knowledge of those who are present at the scene, comprising:
a nonplanar enclosable concealment container substantially formed from a glass having (1) a deep red color that reflects visible light and is permeable to the passage of a substantial segment of rays of light in the infrared region impinging thereon, and (2) a thickness such that said nonplanar enclosable concealment container is substantially black to a human eye and any object placed within said nonplanar enclosable concealment container is not visible to said human eye through said glass; and an infrared camera having a receptor, said infrared camera being positioned within said nonplanar enclosable concealment container at a location such that said infrared rays pass through glass and into said receptor of said infrared camera, said infrared camera enabling a viewer to observe said scene without the cognition of those participating therein without having to add a light source.

2. A surveillance system as claimed in claim 1, in which said infrared camera receptor is a sensor chip.

3. A surveillance system as claimed in claim 2, in which light energy is stored in bins in said sensor chip, said bins storing said energy according to its amplitude.

4. A surveillance system as claimed in claim 3, in which a full charge of light energy in a bin produces a white ray of light, lack of a charge produces black light, and intermediate charges produce light in shades of gray.

5. A surveillance system as claimed in claim 2, in which said chip can store light energy or release it to a monitor.

6. A surveillance system as claimed in claim 1, in which said nonplanar enclosable concealment container is in the form of a decorative or utilitarian object.

7. A surveillance system as claimed in claim 6, in which said nonplanar enclosable concealment container is in the form of a coffee mug.

8. A surveillance system as claimed in claim 6, in which said nonplanar enclosable concealment container is in the form of a vase.

9. A surveillance system as claimed in claim 6, in which said nonplanar enclosable concealment container is in the form of a tobacco jar.

10. A surveillance system for observing a scene without the knowledge of those who may be present at the scene, comprising:
a nonplanar enclosable concealment container in the form of a moveable decorative or utilitarian object that is substantially formed from a glass that (1) reflects visible light and is permeable to the passage of a substantial segment of rays of light in the infrared region impinging thereon, 12) a thickness such that said nonplanar enclosable concealment container is substantially opaque to a human eye and any object placed within said nonplanar enclosable concealment container is not visible to said human eye through said glass, and (3) is formed from a synthetic resin selected from the group consisting of acrylic and polycarbonate resins; and
an infrared camera having a receptor in the form of a sensor chip to receive light rays passing into said infrared camera, said infrared camera being positioned within said nonplanar enclosable concealment container at a location such that said infrared rays pass through said glass and onto said sensor chip of said infrared camera, said infrared camera enabling a viewer to observe said scene without the cognition of those participating therein without having to add a light source.

11. A surveillance system as claimed in claim 10, in which said nonplanar enclosable concealment container transmits through it at least 50% of the infrared light impinging upon it.

12. A surveillance system as claimed in claim 11, in which said nonplanar enclosable concealment container transmits through it at least 85% of the infrared light impinging upon it.

13. A surveillance system as claimed in claim 10, in which the color of said nonplanar enclosable concealment container is a shade of red.

14. A surveillance system as claimed in claim 13, in which the color of said nonplanar enclosable concealment container is deep red, such that the container appears substantially black to the human eye.

15. A surveillance system as claimed in claim 13, in which the color of said nonplanar enclosable concealment container is that identified in the trade by the numeral 2711.

16. A surveillance system as claimed in claim 1, in which said glass transmits at least 85% of the infrared light impinging thereon and said glass is formed from a synthetic resin selected from the group consisting of acrylic and polycarbonate resins.

17. A surveillance system for observing a scene without the knowledge of those who may be present at the scene, comprising:
a nonplanar enclosable concealment container in the form of a moveable decorative or utilitarian object that is substantially formed from a molded glass having (1) a deep red color that reflects visible light and is permeable to the passage of a substantial segment of rays of light in the infrared region such that said glass transmits at least 85% of the infrared light impinging thereon, (2) a thickness such that said nonplanar enclosable concealment container is substantially black to a human eye and any object placed within said nonplanar enclosable concealment container is not visible to said human eye through said glass, and (3) is formed from a synthetic resin selected from the group consisting of acrylic and polycarbonate resins; and
an infrared camera having an receptor, said infrared camera being positioned within said concealment container such that said infrared rays pass through said glass into said receptor of said infrared camera, said infrared camera enabling a viewer to observe said scene without the cognition of those participating therein without having to add a light source.

18. A surveillance system as claimed in claim 17, in which said infrared camera receptor is a sensor chip.

19. A surveillance system as claimed in claim 17, in which said nonplanar enclosable concealment container is in the form of a coffee mug, a vase or a tobacco jar.

20. A surveillance system as claimed in claim 17, in which the color of said glass is that identified in the trade by the numeral 2711.

* * * * *